W. A. LOVELIS.
BRAKE SHOE.
APPLICATION FILED JUNE 6, 1913.
1,078,866.
Patented Nov. 18, 1913.
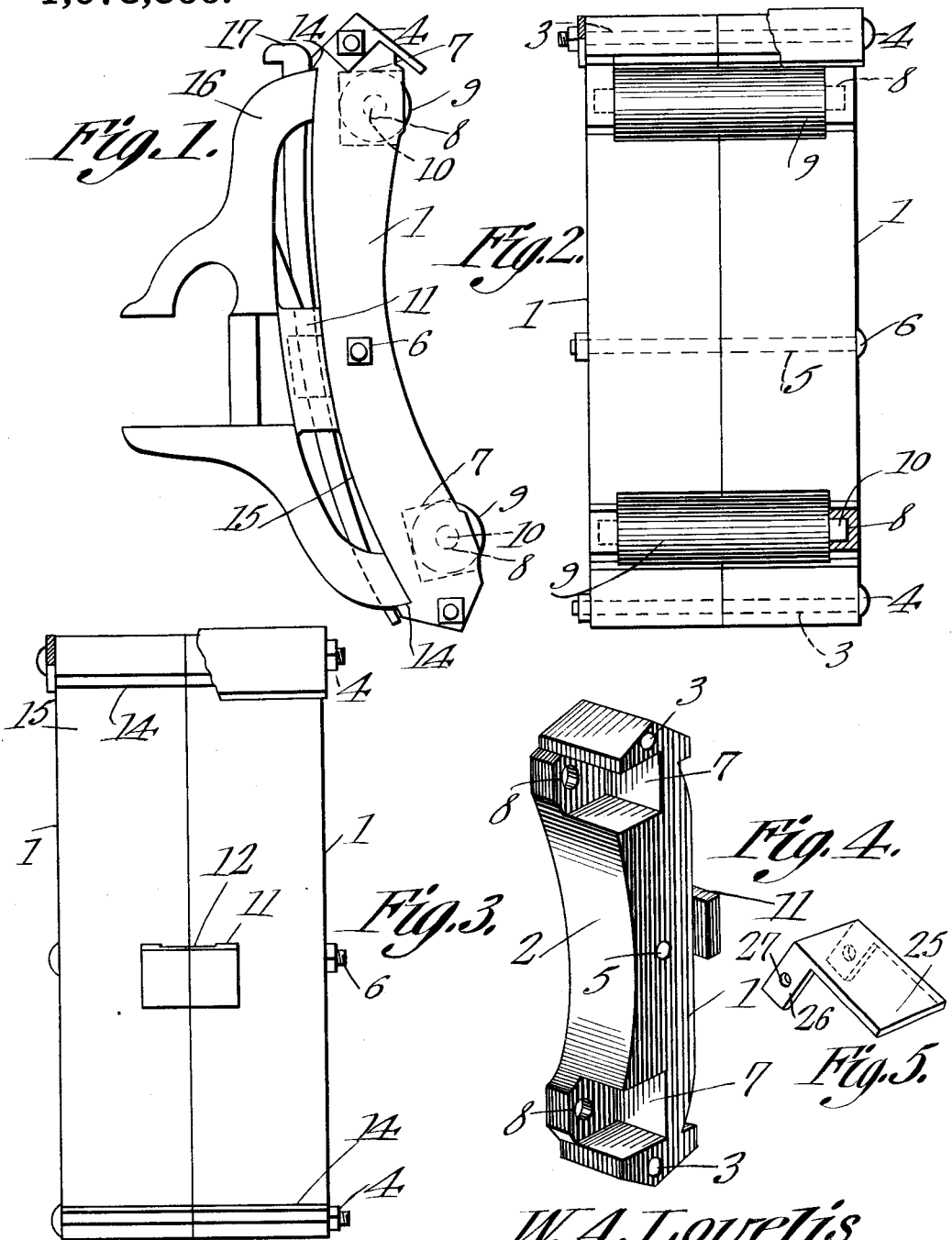
Witnesses
W. A. Lovelis,
Inventor
by C. A. Snow & Co.
Attorneys

UNITED STATES PATENT OFFICE.

WILLIAM ALONZO LOVELIS, OF OZAN, ARKANSAS.

BRAKE-SHOE.

1,078,866. Specification of Letters Patent. Patented Nov. 18, 1913.

Application filed June 6, 1913. Serial No. 772,160.

*To all whom it may concern:*

Be it known that I, WILLIAM A. LOVELIS, a citizen of the United States, residing at Ozan, in the county of Hempstead and State of Arkansas, have invented a new and useful Brake-Shoe, of which the following is a specification.

The device forming the subject matter of this application is a brake shoe adapted to be employed in connection with rotating or moving elements of all sorts, for the purpose of applying a holding pressure thereto.

The device may be employed upon vehicle wheels, cars, fly wheels, shafts, and in connection with any and all forms of moving machine elements, which it may be desired to restrict.

One object of the present invention is to provide a brake shoe which, being equipped with anti-frictional elements, will operate smoothly and effectively, without a jumping motion.

Another object of the invention is to provide novel means whereby the anti-friction rollers may be assembled with the brake shoe.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 shows the invention in side elevation; Fig. 2 is a front elevation; Fig. 3 is a rear elevation; Fig. 4 is a perspective of one of the constituent parts of the brake shoe; Fig. 5 is a perspective of the scraper.

The brake shoe herein disclosed comprises coöperating members which preferably takes the form of blocks 1, each block 1 having a curved face 2 which is presented toward the rotating element wherewith the brake shoe coöperates. Adjacent their ends the blocks 1 are equipped with openings 3 through which pass securing elements 4. Each block 1 is equipped intermediate its ends with an opening 5 through which passes a securing element 6. The securing elements 4 and 6 preferably, although not necessarily, are bolt and nut structures and they constitute means for holding the constituent blocks 1 of the shoe together.

Upon their wheel engaging faces at their inner edges, the blocks are provided with recesses 7, located adjacent the ends of the blocks. The recesses 7 in the respective blocks coöperate to form roller receiving openings located at the ends of the shoe. Formed in each block 1 at one end of the recess 7 therein is a circular hole 8. The hole 8 preferably does not extend outwardly through the side face of the block 1. Rollers 9 are located in the openings defined by the recesses 7, the rollers 9 being equipped at their ends with trunnions 10 which are received rotatably within the holes 8. The rollers 9, as clearly shown in Fig. 1, outstand slightly beyond the curved face 2 of the brake shoe.

The rear faces 15 of the block 1 are equipped adjacent their line of meeting with wings 11 the ends 12 of which are spaced apart slightly from the rear faces 15 of the blocks 1. The blocks 1 are provided upon their rear faces 15 and adjacent their ends with shoulders 14, constituting abutments for a hanger 16 which may be of any approved type. A key 17 is inserted through the hanger 16 and beneath the ends 12 of the wings 11.

From the foregoing it will be seen that there is presented in this application, a brake shoe which will exercise the desired pressure, without causing undue wear upon the rotatable element, the brake shoe being so constructed that pressure may be applied without causing a jumping or shaking of the brake shoe. The blocks 1, when secured together by the elements 4 and 6 retain the rollers 9 in place, and since the trunnions 10 are preferably formed integrally with the ends of the rollers 9, accidental displacement of the rollers will be avoided.

If desired, the structure may include a scraper 25, shown in perspective in Fig. 5. The scraper 25 may be provided with ears 26 having openings 27. The scraper 25 rests upon the upper ends of the blocks 1, and the bolt 4 passes through the openings 27. Any other suitable means, however may be provided for holding the scraper 25 in place. The scraper is fashioned from any suitable substance, preferably resilient.

Having thus described the invention, what is claimed is:—

1. A brake shoe comprising a body; an antifriction element carried by the body and projecting beyond the working face of the body; and a scraper secured to the body and overhanging the antifriction element.

2. A brake shoe comprising a body; an antifriction element carried by the body and projecting beyond the working face of the body; a scraper resting on one end of the body and overhanging the antifriction element, the scraper being provided with an ear overlapping one side face of the body; and a securing member passing through the ear and entering the body.

3. A brake shoe comprising abutting members; an antifrictional element journaled in the said members and projecting beyond the working face of the brake shoe; a scraper applied to one end of the said members and overhanging the antifriction element, the scraper being provided with an ear overlapping the side face of one of said members; and a securing device passing through the ear and through both members, the securing device constituting means for holding the scraper in place, and constituting also means for holding the said members together to retain the antifriction element.

4. A brake shoe comprising coöperating members; an antifriction element journaled in the said members and projecting beyond the working face of the shoe; the said members being provided upon their rear faces with angularly formed wings disposed transversely of the said members and spaced from the rear faces of the said members; a hanger; and a key extended longitudinally of the shoe and engaged with the hanger, the key being engaged beneath the wings.

5. A brake shoe made up of two blocks having their longitudinal edges in abutment; means for holding the blocks together; the blocks being provided upon their working faces and at their meeting edges with coöperating openings defining a recess; and an anti-friction element located in the recess and terminally journaled in the blocks.

In testimony that I claim the foregoing as my own, I have hereto affixed my signature in the presence of two witnesses.

WILLIAM ALONZO LOVELIS.

Witnesses:
R. B. ROBINS,
W. D. JANES.